Jan. 9, 1951 W. H. BRATTAIN 2,537,257
LIGHT-SENSITIVE ELECTRIC DEVICE
Filed Jan. 17, 1947
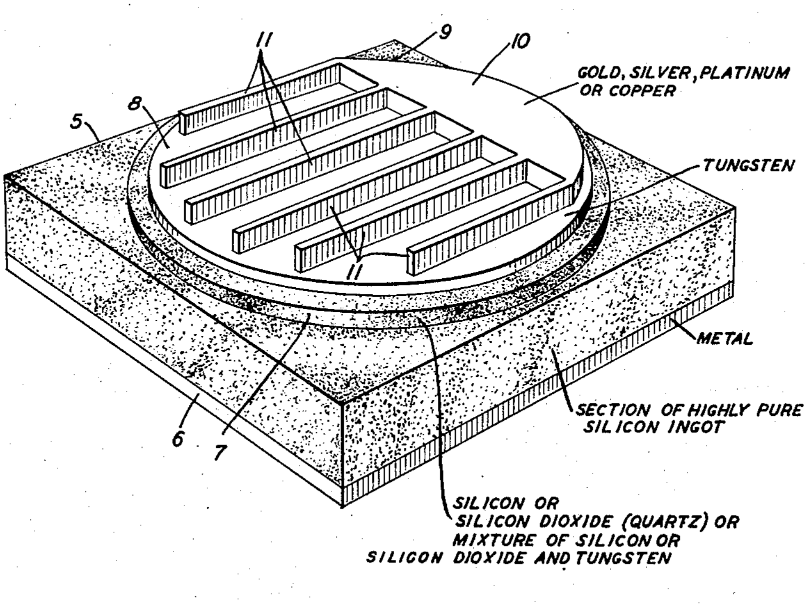
INVENTOR
W. H. BRATTAIN
BY Stanley B. Kent
ATTORNEY Patented Jan. 9, 1951 2,537,257

UNITED STATES PATENT OFFICE 2,537,257

LIGHT-SENSITIVE ELECTRIC DEVICE

Walter H. Brattain, Morristown, N. J., assignor to Bell Telephone Laboratories, Incorporated, New York, N. Y., a corporation of New York Application January 17, 1947, Serial No. 722,525

19 Claims. (Cl. 136—89)

This invention relates to light sensitive electric devices and more particularly to light sensitive electric devices comprising silicon and methods of making such devices.

An object of this invention is to provide an improved light sensitive electric device comprising a body of silicon formed by cooling fused highly purified silicon powder and either vapor-deposited silicon or silicon dioxide.

In an example of practice of this invention a photo-E. M. F. cell is formed by depositing in vacuo a thin film of silicon or silicon dioxide on a slab of silicon produced by cooling fused highly purified silicon powder and providing electrical contacts to separated portions of the silicon or silicon dioxide and the slab of silicon. The slab of silicon may be cut from an ingot of silicon of the kind disclosed in United States Patent 2,402,582 of J. H. Scaff issued June 25, 1946. The slab of silicon may be cut from such an ingot by the process disclosed in United States Patent 2,402,839 of R. S. Ohl issued June 25, 1946. Such slabs may be of any convenient size. One side of the slab is provided with a non-rectifying electrode of metal such as, for example, silver or rhodium. The slab is then placed in an evacuable chamber. After evacuation a thin layer of silicon or silicon dioxide is formed on the face of the slab opposite to the non-rectifying electrode by vaporization of silicon or silicon dioxide and deposition thereof on the surface of the slab. A light-transmitting layer of tungsten is then formed on the thin layer or film of silicon dioxide also in vacuo by vaporization of tungsten and deposition on the film of silicon or silicon dioxide. Finally, an opaque metallic electrode is formed on the surface of the layer of tungsten in the form of a branched conductor which contacts only a portion of the tungsten surface, such opaque metallic electrode being formed by vaporization and deposition in vacuo. Gold is used preferably for such opaque electrode but other metals may be used such as silver, platinum and copper. Terminal conductors for the photo-E. M. F. cell may consist of copper wires or ribbons soldered or otherwise held in contact with the non-rectifying electrode and the branched electrode respectively.

In another example of practice, a photo-E. M. F. cell is formed in a manner substantially like that just described except that alternate thin layers or films of silicon or silicon dioxide and tungsten are deposited on a slab of highly pure silicon in place of the thin layer of silicon or silicon dioxide previously mentioned. These alternate films are each so thin that the combined films consist of a mixture of silicon or silicon dioxide and tungsten. A light transmitting electrode is then formed by depositing a light transmitting layer of tungsten on this layer of a mixture of silicon or silicon dioxide and tungsten. Finally an opaque layer in the form of a branched electrode is formed as described hereinbefore.

Such devices develop a voltage between the terminal conductors when visible or near infra red light irradiates the film of silicon or silicon dioxide or the film mixture of silicon or silicon dioxide and tungsten after passing through the light transmitting film of tungsten in the exposed portions between the branches of the opaque electrode. In use, the surface of the cell carrying the branched electrode is illuminated with radiant energy which it is desired to convert into electrical energy.

The invention will now be described more in detail having reference to the accompanying drawing which consists of a single figure. The dimensions in the drawing are very much exaggerated, particularly the thickness dimensions, for clearness of illustration.

Referring now to the drawing, a photo-E. M. F. cell according to this invention comprises a body 5 of highly purified silicon having approximately parallel plane faces. The lower face is provided with a metal layer 6 of silver or rhodium, for example, to serve as an electrode. A thin layer or film 7 of material including silicon such as substantially pure silicon or silicon dioxide (quartz) is formed by vaporization and deposition in vacuo. On the exposed surface of the layer 7, a light transmitting film 8 of tungsten is formed, also by vaporization and deposition in vacuo. On the exposed surface of film 8, a more substantial contactor 9 of gold is formed as by vaporization and deposition in vacuo. Contactor 9 is formed with a back portion 10 and many branches 11. The contactor 9 is opaque and makes contact with the film 8 at only a small percentage of the total surface of film 8. While only six branches 11 are shown in the drawing, the number used would normally be very much larger in order to furnish satisfactory conductivity from all portions of the film 7. One terminal conductor may be attached to the back portion 10 of contactor 9 and a second terminal may be attached to the metal layer 6. These terminals may be connected by soldering or in any other suitable manner. The above described photo-E. M. F. cell may be mounted in any suitable manner to prevent injury during usage.

The body 5 of highly pure silicon consists of a section cut from an ingot formed by fusing and cooling highly pure silicon powder. One method of producing such an ingot will now be described briefly. Silicon of a purity in excess of 99 per cent obtainable in granular form is placed in a silica crucible in an electric furnace in vacuo or in a helium atmosphere. Because of a tendencv to evolution of gas with violent turbulence of the material, it is desirable to raise the temperature to the melting point by heating the charge slowly. Silicon will be found to fuse at a temperature of the order of 1400 to 1410 degrees centigrade. In order to facilitate the heating process, the silica crucible containing the silicon powder may be placed within a graphite crucible which lends itself to development of heat under the influence of the high frequency field of the electric furnace to a much greater degree than does the silica crucible or its charge of silicon. Care, however, must be taken to avoid exposure of the melted silicon to graphite, oxygen or other materials with which it reacts vigorously. In this manner, the melt may be brought to a temperature of the order of 200 degrees centigrade above the melting point of silicon. A furnace power input of 7.5 to 10 killowatts may be employed, the required time for melting being of the order of ten to twenty minutes depending upon the power. The power is then reduced in steps and the temperature of the melted silicon drops rapidly to the freezing point, approximately six or seven minutes being required for the melt to solidify. The solid metal is then permitted to cool towards room temperature at the rate of approximately 60 centigrade degrees per minute, the cooling being effected by decreasing the power input at the rate of about one-half kilowatt per minute. When the temperature has been reduced to the order of 1150 to 1200 degrees centigrade, the power is shut off and the temperature then falls at the rate of about 130 centigrade degrees per minute.

Granulated silicon of high purity available on the market is produced by crushing material found in a large commercial melt. The crushed material is preferably of a size to pass a 30 mesh screen and to be retained by an 80 mesh screen. The crushed material is purified by treatment with acids until it has attained a purity in excess of 99 per cent. The chemical composition of a typical sample of this material is approximately:

| | | | |
|---|---|---|---|
| Si | 99.85 | O | .061 |
| C | .019 | H | .001 |
| Fe | .031 | Mg | .007 |
| Al | .020 | P | .011 |
| Ca | .003 | Mn | .002 |
| N | .008 | | |

In some samples amounts up to .03 Ti and .004 Cr have been found.

The material of the ingot formed in the manner just described is not homogeneous in its electrical characteristics, but consists of three fairly well defined zones. The upper portion of the ingot which is first to cool develops a positive thermoelectric potential against copper. This zone is designated as the P zone. The lower portion of the ingot develops a negative thermoelectric potential against copper and is designated as the N zone. Between these two zones is a third relatively thin zone of high specific resistance which is called herein the barrier zone. The specific resistance of P zone material is considerably higher than that of ordinary commercial silicon. In the barrier zone the specific resistance rises very abruptly to magnitudes a hundred times those near the upper surface of the P zone. The average resistivity of the N zone material is much lower than that of the other two zones and is of the order of one-third the average resistance of the P zone material.

The section of the ingot composing the body 5 is cut from the ingot in any suitable manner. It is cut preferably from that portion of the ingot consisting of N type silicon but it may be cut from other portions of the ingot. A metal wheel charged with diamond particles is suitable for cutting the ingot, a stream of distilled water being used to clear the cut particles from the kerf and to cool the surfaces. There is an advantage in polishing the upper surface of the body 5. This surface may be polished in many ways. One satisfactory method which has been used is as follows: the surface is first roughed flat with 600 mesh aloxite or M-302 optical powder using an iron lap followed by 1000 mesh aloxite and a lead lap in the subsequent polishing with an optical powder such as, for example, No. 95 optical powder.

One method of forming the non-rectifying electrode 6 is to use a rhodium plating process. In such a process which has been found to be very satisfactory the surface of the slab to be coated is ground flat using a 600 mesh diamond wheel and water lubrication. This surface is then etched in a hot sodium hydroxide solution and washed in distilled water. The surface is then electroplated with rhodium from a hot solution of rhodium triphosphate slightly acidified with phosphoric acid or sulphuric acid. After washing and drying, the rhodium plating makes an excellent contact terminal because it does not loosen from the silicon and is highly resistant to corrosion. A terminal conductor may be secured to such a rhodium plating by soldering. The rhodium coating is tinned with ordinary lead-tin solder using an acidified zinc chloride flux. The solder must not be heated much above its melting point or there is danger of the rhodium being completely dissolved. The end of the terminal conductor is freely tinned, then placed in contact with the tinned rhodium surface and the joint heated until the solder flows, the excess solder being squeezed from between the conductor and the rhodium plating. A strong bond results.

Typical thickness dimensions will now be given merely to assist in practicing the invention. Other thicknesses may be found useful in certain instances. The body 5 may be of any desired thickness so long as it is strong enough to be handled. The metal electrode 6 may be formed of silver 0.1 mil thick or of rhodium as described hereinbefore or of other metals such as gold, aluminum, zinc, cadmium, platinum or copper. Good results have been obtained with a thickness of deposited silicon film 7 of the order of 0.004 mil and of silicon dioxide film 7 of the order of 0.0002 mil. Light transmitting tungsten films of from 0.0003 to 0.0008 mil give optimum sensitivity, a thickness of 0.0004 mil giving good results. For contactor 9 a gold deposit 0.004 mil thick is satisfactory.

In a modified form of the invention the layer 7 may consist of alternately applied layers or films of silicon or silicon dioxide and tungsten, each film being so thin that the combination of films constitutes effectively a mixture of silicon or silicon dioxide and tungsten. Such a photo- E. M. F. cell otherwise may be identical with the cells wherein the layer 7 consists of silicon or silicon dioxide alone which have been described hereinbefore.

Vacuum deposition methods for producing layers of silicon, silicon dioxide, tungsten, gold and other metals are well known and need not be described herein for a clear understanding of this invention.

The light-transmitting layer 8 may comprise a film of a noble metal such as platinum or gold, but tungsten is preferred for this layer. The light-transmitting layer 8 may also comprise cadmium oxide.

The specific examples of practice mentioned hereinbefore have been described merely by way of illustration and are not to be construed in a limiting sense. The invention may find embodiment in other forms than those specifically described hereinbefore. Such embodiments come within the purview of the appended claims.

What is claimed is:

1. A light sensitive electric device comprising a body of silicon formed by cooling fused highly purified silicon powder, a thin layer of one of the materials of the group of materials consisting of silicon alone, an oxygen compound of silicon alone, a mixture of silicon alone with tungsten, and a mixture of an oxygen compound of silicon alone with tungsten deposited on said body of silicon, and electrical conductors contacting respectively said body of silicon and said thin layer of material.

2. A light sensitive electric device comprising a body of silicon formed by cooling fused highly purified silicon powder, a thin film of silicon on a part of the surface of said body of silicon, and electrical conductors contacting respectively said body and said film on remote portions of the surface thereof.

3. A light sensitive electric device comprising a body of silicon formed by cooling fused highly purified silicon powder, a film of silicon on a portion of the surface of said body, a film of tungsten on said first film of silicon, and electrical conductors contacting respectively said body and said film of tungsten on portions of their surfaces remote from each other.

4. A light sensitive electric device comprising a body of silicon formed by cooling fused highly purified silicon powder, a film of silicon of the order of 0.004 mil thick on a part of the surface of said body of silicon, and electrical conductors contacting respectively said film of silicon and said body of silicon on remote portions of the surfaces thereof.

5. A light sensitive electric device comprising a body of silicon formed by cooling fused highly purified silicon powder, a film of silicon of the order of 0.004 mil thick on a part of the surface of said body of silicon, a light-transmitting layer of metal on said film of silicon, and electrical conductors contacting respectively said body of silicon and said light-transmitting layer of metal on remote portions of the surfaces thereof.

6. A light sensitive electrical device comprising a body of silicon formed by cooling fused highly purified silicon powder, a thin film of silicon on a part of the surface of said body of silicon, a light-transmitting film of tungsten between 0.0003 and 0.0008 mil thick overlying a portion of said film of silicon, an opaque metallic contactor connected to a portion only of the surface of said light-transmitting film of tungsten, and a metallic electrode attached to a part of the surface of said body of silicon remote from said film of silicon.

7. A light sensitive electric device comprising a body of silicon formed by cooling fused highly purified silicon powder, a film of silicon of the order of 0.004 mil thick on a part of the surface of said body of silicon, a light-transmitting film of tungsten of the order of 0.0004 mil thick overlying a portion of said film of silicon, an opaque metallic contactor connected to a portion only of the surface of said light-transmitting film of tungsten, and a metallic electrode attached to a part of the surface of said body of silicon remote from said film of silicon.

8. A light sensitive electric device comprising a slice of silicon cut from an ingot formed by cooling fused highly purified silicon powder, a film of silicon of the order of 0.004 mil thick formed by vaporization and deposition in vacuo on one face of said slice of silicon, a light-transmitting film of tungsten between 0.0003 and 0.0008 mil thick overlying a portion of said film of silicon, an opaque branched contactor of gold of the order of 0.04 mil thick connected to a portion only of the surface of said light-transmitting film of tungsten, and a low resistance substantially non-rectifying electrode of silver deposited on the other face of said slice of silicon.

9. A light sensitive electric device comprising a body of silicon formed by cooling fused highly purified silicon powder, a thin film of silicon dioxide on a part of the surface of said body of silicon, and electrical conductors contacting respectively said body and said film on remote portions of the surfaces thereof.

10. A light sensitive electric device comprising a body of silicon formed by cooling fused highly purified silicon powder, a film of silicon dioxide on a portion of the surface of said body, a firm of tungsten on said first film of silicon dioxide, and electrical conductors contacting respectively said body and said film of tungsten on portions of their surfaces remote from each other.

11. A light sensitive electric device comprising a body of silicon formed by cooling fused highly purified silicon powder, a film of silicon dioxide of the order of 0.0002 mil thick on a part of the surface of said body of silicon, and electrical conductors contacting respectively said film of silicon dioxide and said body of silicon on remoted portions of the surfaces thereof.

12. A light sensitive electric device comprising a body of silicon formed by cooling fused highly purified silicon powder, a thin film of silicon dioxide on a part of the surface of said body of silicon, a light-transmitting film of tungsten between 0.0003 and 0.0008 mil thick overlying a portion of said film of silicon dioxide, an opaque metallic contactor connected to a portion only of the surface of said light-transmitting film of tungsten, and a metallic electrode attached to a part of the surface of said body of silicon remote from said thin film of silicon dioxide.

13. A light sensitive electric device comprising a body of silicon formed by cooling fused highly purified silicon powder, a thin film of silicon dioxide on a part of the surface of said body of silicon, a light-transmitting film of tungsten between 0.0003 and 0.0008 mil thick overlying a portion of said film of silicon dioxide, an opaque metallic contactor connected to a portion only of the surface of said light-transmitting film of tungsten, and an electrode comprising rhodium attached to a part of the surface of said body of silicon remote from said thin film of silicon dioxide.

14. A light sensitive electric device comprising a slice of silicon cut from an ingot formed by cooling fused highly purified silicon powder, a film of silicon dioxide of the order of 0.0002 mil thick on one face of said slice of silicon, a light-transmitting film of tungsten of the order of 0.0004 mil thick overlying a portion of said film of silicon dioxide, an opaque metallic contactor connected to a portion only of the surface of said light-transmitting film of tungsten, and a metallic electrode attached to the opposite face of said slice of silicon.

15. A light sensitive electric device comprising a slice of silicon cut from an ingot formed by cooling fused highly purified silicon powder, a film of silicon dioxide of the order of 0.0002 mil thick formed of vaporization and deposition in vacuo on one face of said slice of silicon, a light-transmitting film of tungsten between 0.0003 and 0.0008 mil thick overlying a portion of said film of silicon dioxide, an opaque branched contactor of gold of the order of 0.04 mil thick connected to a portion only of the surface of said light-transmitting film of tungsten, and a low resistance substantially non-rectifying electrode formed on the opposite face of said slice of silicon.

16. A light sensitive electric device comprising a body of silicon formed by cooling fused highly purfied silicon powder, a thin layer of one of the materials of the group of materials consisting of silicon alone, an oxygen compound of silicon alone, a mixture of silicon alone with tungsten, and a mixture of an oxygen compound of silicon alone with tungsten on a part of the surface of said body of silicon, a light-transmitting layer of cadmium oxide on said thin layer of material, and electrical conductors contacting respectively said body of silicon and said layer of cadmium oxide.

17. A method of fabricating a photo-E. M. F.

cell which comprises fusing purified powdered silicon in an inert atmosphere in a silica ($SiO_2$) crucible, cooling the silicon so as to produce an ingot which includes P type and N type silicon, cutting a slice from said ingot, and forming in vacuo by vaporization and deposition a layer of one of the materials of the group of materials consisting of silicon alone, an oxygen compound of silicon alone, a mixture of silicon alone with tungsten, and a mixture of an oxygen compound of silicon alone with tungsten on a portion of the surface of said slice of silicon and subsequently a light-transmitting conducting layer on said layer of material.

18. A light sensitive electric device comprising a body of silicon formed by cooling fused highly purified silicon powder, a thin layer of material consisting of silicon and tungsten deposited on said body of silicon, and electrical conductors contacting respectively said body of silicon and said layer of material.

19. A light sensitive electric device comprising a body of silicon formed by cooling fused highly purified silicon powder, a thin layer of material consisting of silicon dioxide and tungsten deposited on said body of silicon, and electrical conductors contacting respectively said body of silicon and said layer of material which consist of silicon dioxide and tungsten.

WALTER H. BRATTAIN.

REFERENCES CITED

The following references are of record in the file of this patent:

UNITED STATES PATENTS

| Number | Name | Date |
|---|---|---|
| 2,015,431 | McIlvaine | Sept. 24, 1935 |
| 2,189,580 | Hewlett | Feb. 6, 1940 |
| 2,402,662 | Ohl | June 25, 1946 |
| 2,423,125 | Teal | July 1, 1947 |